Nov. 2, 1948.                D. SULPRIZIO                2,452,965
                    BEARING FOR SPINDLES AND THE LIKE
                         Filed April 12, 1945
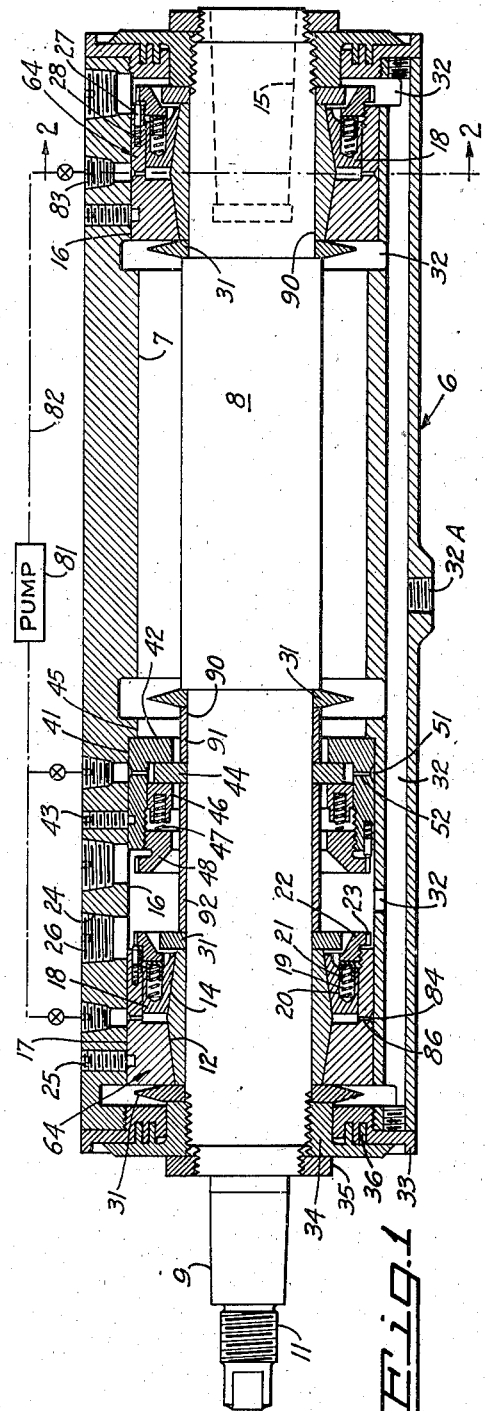
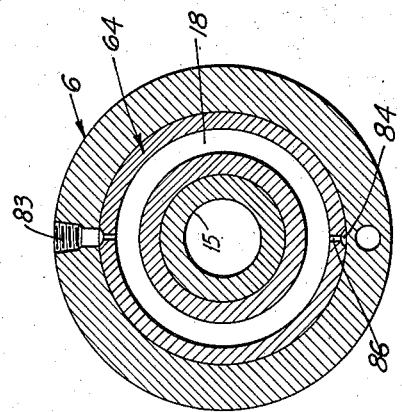
INVENTOR.
D. SULPRIZIO
BY
ATTORNEY Patented Nov. 2, 1948

2,452,965

UNITED STATES PATENT OFFICE 2,452,965

BEARING FOR SPINDLES AND THE LIKE

Deuta Sulprizio, Oakland, Calif.

Application April 12, 1945, Serial No. 587,956

6 Claims. (Cl. 308—70)

This invention relates to a new principle and improvements in bearings and particularly to a bearing construction useful to support a spindle in a lathe, drill press, boring mill, milling machine or the like. The bearing is not limited in use or application to any of these machines, being suitable for use on any rotatable device. It is, however, of particular utility when employed on a spindle shaft which must be rotated at high speed and with considerable accuracy. I will therefore describe it in this connection although it is not limited to this use for, as I have pointed out, the bearing is useful to support any shaft or rotatable element for rotation with respect to a fixed support.

In the operation of machine tools a spindle is utilized to rotate a tool, for example, to cut, grind or drill a cooperatively positioned piece of work to a desired extent. When extreme accuracy is necessary, the mounting of the spindle for rotation presents a definite problem. Further, in operation, the spindle and means employed to mount the spindle for rotation must be examined frequently to insure that undue wear has not occurred for this will destroy the accuracy of the machine operation.

The spindle construction of the present invention includes the provision on the spindle of at least two conical bearing members cooperatively positioned with respect to one another and rotatable in suitable supporting bearing members one of which is slidable and is normally urged into engagement with the conical bearing surfaces. The positive bias provided upon the bearing members is controllably released during spindle rotation by forcing a fluid against the members to overcome the applied bias to a controlled extent. By regulating the applied pressure of the fluid, the bearing support for the spindle can be maintained at that point where the spindle rotates with a desired degree of freedom. The clearance between the bearing on the spindle and the support therefor is thus self-adjusting and is independent of the temperature of the structure. The initial clearance is controlled by adjusting the applied bias; when fluid pressure is applied, the correct clearance is provided at any speed for the clearance is a function of the applied bias and is independent of the spindle speed. The fluid forced against the bearing member passes between each bearing surface and its cooperative bearing member. Thus, the spindle, in effect, floats on a film of the fluid. Wear is thus minimized; if any occurs, it is automatically compensated.

It is in general the broad object of the present invention to provide a new principle and an improved bearing construction.

A further object of the present invention is to provide a novel bearing support for a spindle or like rotatable structure.

An additional object is to provide an improved spindle construction.

The invention includes other objects and features of advantage, some of which, together with the foregoing, will appear hereinafter, wherein a bearing embodying the present invention is disclosed as a support for a spindle.

In the drawings accompanying and forming a part hereof

Figure 1 is a side elevation partly in section through the spindle and the bearing.

Figure 2 is a transverse section through the device illustrated in Figure 1 and taken along the line 2—2.

Referring to the drawing, numeral 6 indicates a suitable casing or housing structure. As this is shown in the drawing, it appears as a separate unit. However, it can be a headstock in a lathe or the spindle support in a drill press, boring mill or milling machine or other shaft support; or, in some cases, the shaft can be stationary and the casing can rotate. The casing includes a central passage 7, through which a shaft or a spindle generally indicated at 8 extends. This spindle can take any desired form and in the drawing I have shown a generally solid spindle having a tapered end 9 to receive a driven element such as a pulley or sprocket, the latter being locked in place by a nut (not shown) secured on threads 11. At its other end I have shown tool receiving and attaching means in the form of a tapered recess 15; this means can take any desired form.

Adjacent each end of the spindle, a bearing structure 64 is provided, each structure providing a bearing support for spindle 8 from one another to provide in effect, on the spindle, two truncated conical frustrums, the bases of which are in abutment. The casing 6 is recessed at each end as at 16 and in this recess are mounted bearing members 17 and 18 having faces engaging and supporting the conical bearings 12 and 14. Each bearing member 17 is slideable into position in the casing in which it is locked in position by screw 25. Bearing member 18 is slideably mounted in member 17. The two members are urged together by springs 19 extending into apertures 20 in member 18 and carrying caps 21 which press against lock ring 22 screwed into the end of member 17. The periphery of lock ring 22 is serrated as at 23, the serrations permitting the position of the locking ring to be adjusted through aperture 24 upon removal of plug 26. The ring is retained in an adjusted position by pin 27 biased by spring 28 to engage a cooperatively positioned serration. Each bearing 64 is self contained, being slideable into position on the spindle and shaft where it is retained by screw 25.

A fluid pump 81 is provided and is connected by lines 82 to apertures 83 in the casing. Each bearing member has a peripheral groove 84 with a plurality of passages 86 extending inwardly to release fluid between the members 17 and 18 and controllably move them apart to provide the desired fit between members 17 and 18 and bearings 12 and 14. The maximum clearance between them is controlled by adjustment of lock ring 22, member 18 only being slideable in member 17 until it abuts the locking rings. This enables equal fluid application to be made to several bearings from a single fluid pressure source. By adjusting the fluid pressure one can regulate the freedom in the bearings and the ease of rotation of the spindle 8. One can use any suitable fluid but a good lubricant is preferably employed, although, depending upon the use, one can employ air, water or other fluid.

Fluid throwers 31 are preferably positioned adjacent each end of each bearing if a liquid is employed as the fluid, since it is desirable that the spindle does not rotate in a body of liquid. Fluid passing from each bearing is removed through passages 32 and outlet 32A. To seal the casing a ring, 33 is screwed into each end thereof. A collar 34 is screwed on each end of the spindle and is retained in place by a locknut 35. A plurality of labyrinth grooves 36 are provided between each collar 34 and its associated ring 33 to prevent fluid leakage from the casing.

To take care of end thrust on the spindle, a similar bearing construction can be employed. In this case, a ring 41 is provided with a shoulder 42 at one end, the ring being slideable into place against a shoulder 45 on the casing and retained in place by screw 43. A ring 44 is positioned on the spindle and on one side abuts the shoulder 42. The other side of ring 44 is engaged by slideable ring 46 urged by springs 47 toward the ring 44. A lock ring 48, fashioned and adjustable like ring 23, enables the bias on the ring 44 to be adjusted. Ring 41 is grooved as at 51 and a plurality of passages 52 admit fluid to between the shoulder 42 and ring 46 to control the bias thrust opposition of springs 47. Fluid passing the thrust bearing is released through passages 32, throw 31 being provided to drain liquid from the shaft. Fluid under pressure can thus be applied to the thrust bearing to control the extent of pressure exerted by slideable ring 46 against the ring 42 on the spindle.

The several elements can be formed integral with the spindle but in the form shown, the left hand end of the spindle is reduced in diameter, as at 90, and thrower 31, spacer 91, ring 44, spacer 92, thrower 31, conical bearings 12 and 14 and thrower 31 are slipped on, in the order recited, and are retained in place by collar 34 and nut 35. The same construction is, in effect, employed at the right hand end of the machine, thrower 31, bearings 12 and 14 and a thrower 31 being retained in place in like manner.

The spindle described can be modified in various ways without departing from the spirit of the invention. For example, in a spindle intended for only a light load application, it may not be necessary to include the thrust bearing or only one of the fluid actuated bearings need be incorporated, a roller bearing, needle bearing, or other type of bearing being employed to support the other end of the spindle shaft. The conical bearings 12 and 14 need not face outwardly one from the other for, if desired, they may face each other, in which case the bearings 64 and bearing members 17 or 18 are reversed, the fluid application being on the outer faces of the bearing members to force them away from the bearing surfaces, the springs being provided between the bearing members to oppose the fluid application.

I claim:

1. In combination, a shaft, a pair of conical bearing members positioned adjacent each other on said shaft and each having a conical bearing face thereon extending at an angle to the other conical bearing face of the other member and to the longitudinal axis of said shaft, a first bearing member cooperatively positioned with respect to one of said conical bearing members, a second bearing member cooperatively positioned with respect to the other of said conical bearing members and slideably mounted in substantially fluidtight engagement with said first bearing member, means for limiting sliding movement of said second member in said first member, means positively urging said first and second bearing members to engage said conical bearing members, and means for admitting fluid under pressure between said first and said second bearing members to oppose the positive urging means and to slide said second member with respect to said first member to control the engagement between said first and second members and said conical bearing members.

2. In combination, a shaft, a pair of conical bearing members positioned adjacent each other on said shaft, each member being in the form of a truncated frustum of a cone, said members being in abutment along that surface corresponding to the base of each frustum and each having a bearing face thereon extending at an obtuse angle to the other conical bearing face of the other member and to the longitudinal axis of said shaft, a first bearing member cooperatively positioned with respect to one of said conical bearing members, a second bearing member cooperatively positioned with respect to the other of said conical bearing members and slideably mounted in said first bearing member in substantially fluidtight engagement therewith, means urging said first and second bearing member together and into engagement with said conical bearing members, and means for admitting fluid under pressure between said bearing members to oppose the urging means and to slide said second member on said first member to control engagement between said members and said conical bearing members.

3. In combination, a shaft, a pair of conical bearing members positioned adjacent each other on said shaft, each member being in the form of a truncated frustum of a cone, said members being in abutment along that surface corresponding to the base of each conical frustum and each having a bearing face thereon extending at an obtuse angle to the other conical bearing face of the other member and to the longitudinal axis of said shaft, a first bearing member cooperatively positioned with respect to one of said conical bearing members, a second bearing member cooperatively positioned with respect to the other of said conical bearing members and slideably mounted in said first bearing member in substantially fluidtight engagement therewith, a locking ring screwed into said first member to limit travel of said second member, a plurality of springs between said ring and said second member urging said second member away from ring, and a fluid passage through said first member for admitting fluid under pressure between said members to oppose the urge of said springs and to slide said second member on said first member to control engagement between said members and said conical bearing members.

4. In combination, a shaft, a pair of conical bearing members positioned adjacent each other on said shaft and each having a conical bearing face thereon extending at an angle to the other conical bearing face of the other member and to the longitudinal axis of said shaft, a first bearing member cooperatively positioned with respect to one of said conical bearing members, a second bearing member cooperatively positioned with respect to the other of said conical bearing members and slideably mounted in a substantially fluidtight engagement with said first bearing member, a locking ring screwed into said first member to limit travel of said second member, a plurality of springs between said ring and said second member urging said second member away from ring, and a fluid passage through said first member for admitting fluid under pressure between said members to oppose the urge of said springs and to slide said second member with respect to said first member to control the engagement between said first and second members and said conical bearing members.

5. In combination, a housing, a shaft in said housing, a plurality of bearing structures for supporting said shaft in said housing, each of said structures comprising a pair of conical bearing members positioned adjacent each other on said shaft and each having a conical bearing face thereon extending at an angle to the other conical bearing face of the other member and to the longitudinal axis of said shaft, a first bearing member cooperatively positioned with respect to one of said conical bearing members, a second bearing member cooperatively positioned with respect to the other of said conical bearing members and slideably mounted in substantially fluidtight engagement with said first member, means for limiting sliding movement of said second member in said first member, means positively urging said first and second bearing members to engage said conical bearing members, and means for admitting fluid under pressure to between said bearing members to oppose the positive urging means and to slide said second member with respect to said first member to control the engagement between said first and second members and said conical bearing members.

6. In combination, a housing, a shaft, a pair of conical bearing members positioned adjacent each other on said shaft and each having a conical bearing face thereon extending at an angle to the other conical bearing face of the other member and to the longitudinal axis of said shaft, a first bearing member in said housing cooperatively positioned with respect to one of said conical bearing members, a second bearing member cooperatively positioned with respect to the other of said conical bearing members and slideably mounted in a substantially fluidtight engagement in said housing, means for limiting sliding movement of said second member in said housing, means positively urging said first and second bearing members to engage said conical bearing members, and means for admitting fluid under pressure to between said bearing members to oppose the positive urging means and to slide said second member with respect to said housing to control the engagement between said first and second members and said conical bearing members.

DEUTA SULPRIZIO.

REFERENCES CITED

The following references are of record in the file of this patent:

UNITED STATES PATENTS

| Number | Name | Date |
| --- | --- | --- |
| 1,337,742 | Abbott | Apr. 20, 1920 |
| 1,690,425 | Norton | Nov. 6, 1928 |
| 1,927,924 | De Vlieg | Sept. 26, 1933 |
| 1,931,389 | Norton | Oct. 17, 1933 |
| 1,940,299 | Fletcher | Dec. 19, 1933 |
| 2,389,687 | Rickenmann | Nov. 27, 1945 |

FOREIGN PATENTS

| Number | Country | Date |
| --- | --- | --- |
| 106,595 | Switzerland | Sept. 1, 1924 |
| 553,068 | France | Feb. 3, 1923 |